United States Patent [19]

Malaval

[11] Patent Number: 4,534,140
[45] Date of Patent: Aug. 13, 1985

[54] ANNULAR SLAB FOR CLOSING THE VESSEL OF A FAST NEUTRON NUCLEAR REACTOR

[75] Inventor: Claude Malaval, Antony, France

[73] Assignee: Novatome, Le Plessis Robinson, France

[21] Appl. No.: 472,814

[22] Filed: Mar. 7, 1983

[30] Foreign Application Priority Data

Apr. 8, 1982 [FR] France ................................ 82 06125

[51] Int. Cl.³ .............................................. E04H 7/20
[52] U.S. Cl. .......................................... 52/21; 52/224;
    52/246; 220/3; 376/205; 376/296
[58] Field of Search .................... 52/21, 245, 20, 606,
    52/224; 220/3; 376/205, 296

[56] References Cited

U.S. PATENT DOCUMENTS

| | | | |
|---|---|---|---|
| 3,293,139 | 12/1966 | Bellier | 220/3 X |
| 3,355,357 | 11/1967 | Sage | 52/224 X |
| 3,389,516 | 6/1968 | Ziegler | 52/20 X |
| 3,568,379 | 3/1971 | Johnson et al. | 52/21 |
| 3,568,385 | 3/1971 | Cruset et al. | 220/3 X |
| 3,640,032 | 2/1972 | Jubb | 52/224 X |

FOREIGN PATENT DOCUMENTS 1184456  3/1970  United Kingdom ................... 52/224

*Primary Examiner*—Donald G. Kelly
*Assistant Examiner*—Creighton H. Smith

[57] ABSTRACT

Annular slab for closing the vessel of a fast nuclear reactor, comprising at least one downwardly divergent frusto-conical sleeve coaxial with the inner and outer sleeves delimiting the slab, dividing the slab envelope into upper and lower parts respectively filled with concrete incorporating metal reinforcements and with concrete for radiation protection.

6 Claims, 4 Drawing Figures

ANNULAR SLAB FOR CLOSING THE VESSEL OF A FAST NEUTRON NUCLEAR REACTOR

FIELD OF THE INVENTION

The invention relates to an annular slab for closing the vessel of a fast neutron nuclear reactor.

BACKGROUND OF THE INVENTION

Fast neutron nuclear reactors generally comprise a concrete structure including a cylindrical vessel well with a vertical axis, inside which is located the main reactor vessel surrounded by the safety vessel and closed by the slab resting on the upper part of the vessel well. The main vessel and the safety vessel of the reactor are suspended from the lower part of the slab, which consists of a composite structure of steel and concrete.

This structure consists of an annular envelope filled with concrete, providing, in its central part, a cylindrical space to enable the slab to accommodate the large rotating plug carrying all the devices for handling the fuel assemblies forming the reactor core located inside the vessel.

The annular envelope consists of two coaxial cylindrical sleeves and of two annular face plates joined to each of the sleeves in their upper part and lower part, respectively.

Cylindrical spaces are provided inside the envelope by sleeves passing right through the slab and emerging in the region of circular openings provided in the upper and lower face-plates of the slab. The concrete filling occupies the interior volume of the envelope except for these cylindrical spaces permitting the passage of the reactor components immersed in the vessel by their lower parts, such as the primary pumps and the intermediate exchangers.

Radially oriented stiffeners permit rigid assembly of the cylindrical sleeves, the upper and lower face plates and the sleeves for the passage of the components. These various elements are welded together.

The outer cylindrical sleeve of the envelope of the slab is used for fixing the latter on top of the vessel well. In fact, a sleeve of the same diameter is fixed to the upper part of the vessel well, and the slab is fixed by joining the outer sleeve of the slab to this support sleeve.

The purpose of the reactor vessel is to contain the primary fluid kept at high temperature by the heat evolved by the core. This primary fluid is generally liquid sodium.

Those parts of the slab oriented towards the inside of the vessel, i.e., the lower face-plate and the sheaths for the passage of the components, must therefore be cooled in order to limit the extent to which they are heated and in order to prevent a reduction in their mechanical strength. Cooling tubes are therefore placed in contact with the lower face plate and the sheaths for the passage of components, and water circulation is set up inside these cooling tubes, the latter being embedded in the filling concrete of the slab.

Moreover, the lower face plate is protected from the heat of the primary fluid by a lagging.

The expansions of the slab are therefore limited, and it is thus possible to join it to the support sleeve fixed to the vessel well.

When the large rotating plug is resting in its housing in the center of the annular slab, its extremely large weight is entirely supported by the slab, of which the upper face plate operates under compression and the lower face plate under tension.

The whole of the metal structure of the slab, comprising the outer sleeve, the inner sleeve, the upper and lower face plates, the sheaths for the passage of the components and the radially oriented, vertical stiffeners, must therefore possess very great strength and rigidity.

In particular, to transmit the shear forces without discontinuity, the stiffeners must be very close to one another, whereby the interior volume of the envelope of the slab is divided up into extremely small portions. The filling concrete therefore makes virtually no contribution to the strength of the whole and serves only to provide protection against the radiation from the materials contained inside the vessel.

The metal structure of the slab is extremely heavy, expensive and difficult to weld, this structure also being made more complex by the fact that it is necessary to provide cooling tubes in contact with the sheaths for the passage of the components and in contact with the lower face plate, which withstands very large stresses. These cooling tubes have to pass through the radial stiffeners, in which numerous openings must be provided.

SUMMARY OF THE INVENTION

The object of the invention is therefore to propose an annular slab for closing the vessel of a fast neutron nuclear reactor, the concrete structure of which includes a cylindrical vessel well with a vertical axis, on the upper part of which the slab rests horizontally, the said slab consisting of a composite structure of steel and concrete, which itself carries the vessel suspended from its lower part and which comprises an annular envelope consisting of two coaxial cylindrical sleeves and two annular face plates joined together directly and by means of a stiffening assembly, the said envelope being filled with concrete except for cylindrical spaces with axes parallel to the axis of the sleeves and passing right through the slab for the passage of the reactor components immersed in the vessel, this slab possessing great strength and rigidity despite a simple structure, a greater ease of construction and a smaller mass.

For this purpose, the slab comprises, as the stiffening element, inside the envelope, at least one frusto-conical sleeve coaxial with the sleeves limiting the slab, welded to the envelope along its small base in the region of the upper part of this envelope, and along its large base in the region of the lower part of the latter, possessing openings for the passage of the components and dividing the interior volume of the envelope into two superposed parts.

According to a preferred embodiment of the invention, the upper part of the interior volume of the envelope, above the frusto-conical sleeve, is filled with concrete incorporating metal reinforcements and forming a continuous strong structure over the entire periphery of the slab.

BRIEF DESCRIPTION OF THE DRAWINGS

In order to provide a clear understanding of the invention, an embodiment of a slab according to the prior art and an embodiment of a slab according to the invention will now be described by way of examples, with reference to the accompanying drawings.

FIG. 1 shows the vessel well 1 of a fast neutron nuclear reactor, comprising, in its upper part, a device 2 for anchoring a support sleeve 4, the diameter of which corresponds to the internal diameter of the vessel well and to the external diameter of the slab 3.

Figure 1:
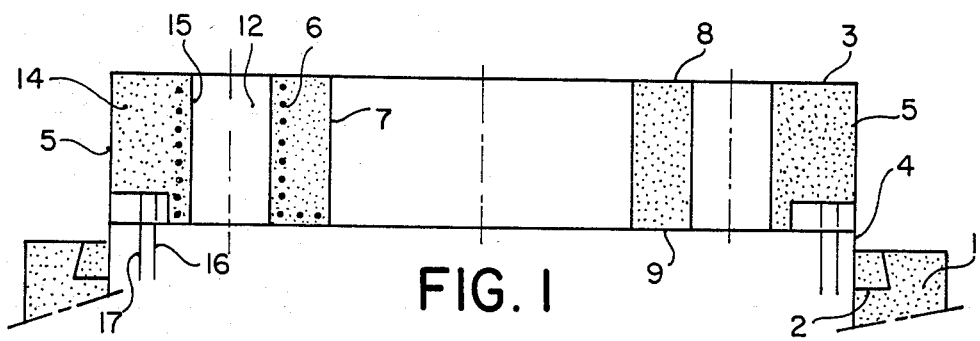
FIG. 1 shows, in a sectional view through a vertical plane along line A—A of FIG. 2, a slab according to the prior art in position on a fast neutron nuclear reactor.
Figure 2:
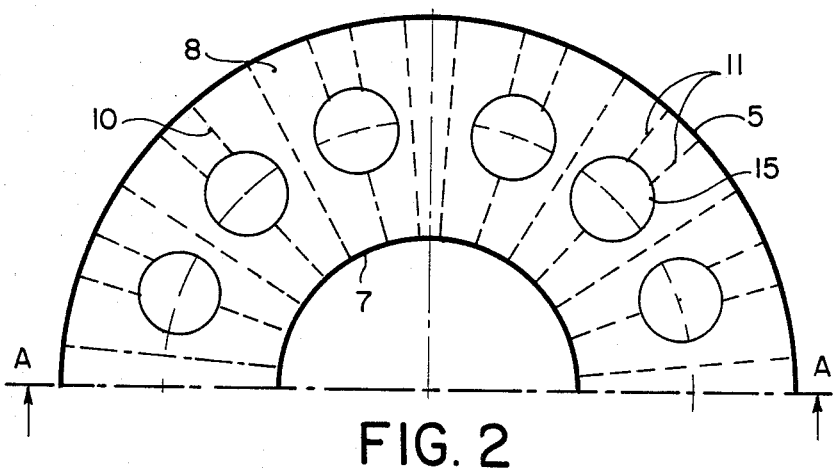
FIG. 2 shows a plan half-view of the slab shown in FIG. 1.

As can be seen in FIGS. 1 and 2, the slab comprises an outer sleeve 5 having the same diameter as the support sleeve 4 to which it is welded, and an inner sleeve 7 coaxial with the sleeve 5. These sleeves 5 and 7 are welded to an annular upper face plate 8 and to an annular lower face plate 9, the sleeves 5 and 7 and the face plates 8 and 9 together constituting the envelope of the slab.

The cylindrical sleeves and the face plates are also joined to one another by radially oriented, vertical stiffeners 10.

The interior volume of the envelope is filled with concrete 14, except for the cylindrical vertical spaces 12 provided by virtue of cylindrical sheaths 15 inside the envelope of the slab. These cylindrical spaces 12, passing right through the slab, permit the passage of the nuclear reactor components immersed in the vessel, such as the pumps or the intermediate exchangers. The sheaths 15 are welded to the face plates 8 and 9, which possess circular openings corresponding to these sheaths and to the outer sleeve 5, via radially oriented, vertical stiffeners 11.

The stiffeners 10, the sheaths 15 and the stiffeners 11 together ensure the stiffening of the envelope of the slab.

It is seen that the interior volume of this slab is divided up into very small portions and that the concrete 14 cannot therefore form a strong structure over the whole periphery of the slab.

Furthermore, the cooling tubes 6 for the sheaths 15 and the lower face plate 9 must pass through numerous vertical stiffeners over the course of their length.

The main vessel 16 and the safety vessel 17 of the reactor consist of a cylindrical sleeve of large diameter, the upper part of which, shown in FIG. 1, is fixed inside the slab for the suspension of these vessels, and of a curved base comprising several elements of spherical shape.

The lower part of the cylindrical sleeve and the curved bases of the vessels have not been shown in FIG. 1 inside the vessel well.

Figure 3:
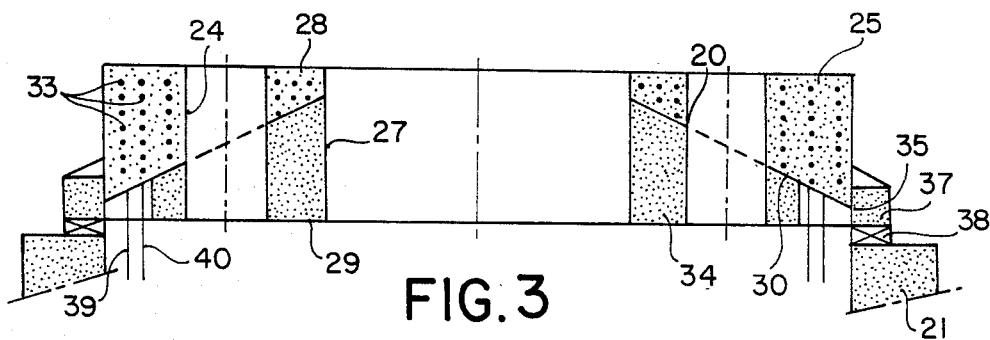
FIG. 3 shows, in a sectional view along line B—B of FIG. 4, a slab according to the invention in position on the vessel well of a fast neutron nuclear reactor.

FIG. 3 shows a slab according to the invention, 20, resting on the upper part of the vessel well 21.

Figure 4:
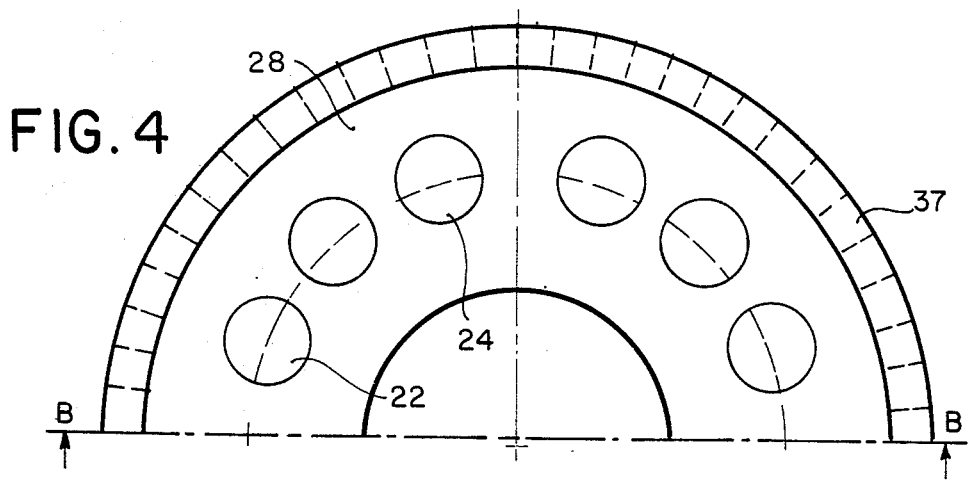
FIG. 4 shows a plan half-view of the slab shown in FIG. 3. Detailed description

As shown in FIGS. 3 and 4, this slab 20 comprises an envelope consisting of an outer sleeve 25 and an inner sleeve 27, which are coaxial, an upper face plate 28 and a lower face plate 29. Sheaths for the passage of the components, 24, are arranged inside this envelope in the region of openings 22 provided in the upper and lower face plates of the envelope.

The stiffening assembly of the envelope consists of a simple frusto-conical sleeve 30 coaxial with the sleeves 25 and 27.

The frusto-conical sleeve 30 is welded along its small base to the inner cylindrical sleeve 27, in the region of the upper part of the slab. The sleeve 30 is also welded along its large base to the outer sleeve 25, in the region of the lower part of the slab.

The sleeve 30 is provided with openings permitting the passage of the sheaths 24, and welded to these sheaths 24 around the contour of these openings.

The frusto-conical sleeve 30 separates the interior volume of the envelope of the slab into two superimposed parts, one being located below the sleeve 30 and the other above this sleeve.

The part located below the sleeve 30 is filled with concrete for radiation protection, 34, by virtue of filling openings passing through the sleeve 30.

The upper part of the interior volume of the envelope, above the frusto-conical sleeve 30, is filled with concrete incorporating metal reinforcements 33 arranged, in particular, along concentric paths throughout the interior volume of the slab. In this way, the reinforced concrete filling this part of the slab makes a significant contribution to the strength of the latter.

The outer sleeve 25 is reinforced in its lower part 35 to which the large base of the frusto-conical sleeve 30 is joined.

A support structure 37, consisting of an annular belt of square cross-section, is fixed to the outer surface of this reinforced part of the sleeve 25. This annular structure 37 consists of a steel envelope welded to the reinforced part of the outer sleeve 25 and filled with concrete. The support structure 37 rests on a sliding support 38 carried by the upper part of the vessel well 21.

The main vessel 40 and the safety vessel 39 are fixed by their upper parts to the frusto-conical sleeve 30, whereby they are suspended under the slab 20.

When the slab is loaded in its central part, in the well provided by the sleeve 27 where the large rotating plug is located, the load being due to this rotating plug and to the devices for handling the fuel assemblies which it supports, the distribution of the stresses in the slab is very different from the distribution in the case of a slab according to the prior art, such as shown in FIG. 1. In fact, the weight of the large rotating plug and of the components carried by the slab results in compression forces exerted on the upper face plate of the slab and on the upper part of the frusto-conical sleeve, while the tensile forces exerted on the lower part of the frusto-conical sleeve are absorbed by the reinforced part of the outer sleeve 25 and by the support structure 37.

Furthermore, the tensile forces exerted on the lower face plate of the slab are of very small magnitude.

That part of the slab which is located under the frusto-conical sleeve 30 is subjected to very small stresses, and, in this zone, the interior volume of the envelope of the slab is filled with concrete for radiation protection.

On the other hand, that part of the interior volume of the envelope of the slab which is located above the frusto-conical sleeve 30 is filled with concrete incorporating metal reinforcements arranged, in particular, in a concentric manner in the slab.

This reinforced concrete provides the mechanical strength of the slab, together with the sleeves, the face plates, the sheaths and the frusto-conical sleeve serving as a stiffener.

It is therefore possible to reduce the thickness of the metal elements forming the envelope of the slab, and in particular to reduce the thickness of the lower face plate, which is only subjected to stresses of small magnitude.

The frusto-conical sleeve 30, which is embedded in the protective concrete, cannot be deformed by buckling, whereby it can be manufactured using a metal sheet of moderate thickness, and it need not be reinforced.

Reinforcing the outer sleeve 25 in its lower part and surrounding this sleeve with the support structure 37 makes it possible to absorb the radial forces and to have the neutral deformation line of the slab as close as possible to the supports.

Finally, welding the sheaths 24 to the frusto-conical sleeve 30, the latter itself being fixed to the outer and inner sleeves 25 and 27, makes it possible to absorb some of the shear forces.

The main advantages of the slab according to the invention are that it is possible to obtain great mechanical strength and rigidity of the slab with a much simpler structure which is easier to construct and of smaller weight.

Furthermore, the new structure of the slab according to the invention makes it possible to rest it on the upper part of the vessel well and to avoid the need to join it to a support sleeve fixed to the vessel well, by means of a weld exposed to the heat from the primary fluid.

Part of the filling concrete of the slab makes a contribution to the great mechanical strength and rigidity of the slab.

Avoiding the use of radially oriented, vertical stiffeners over the whole height of the slab allows easy arrangement of the cooling tubes for the lower face plate and the sheaths for the passage of the components, without having to provide perforations in the stiffeners.

The frusto-conical sleeve can be welded at its ends to the upper and lower face plates instead of being welded to the outer and inner sleeves.

The frusto-conical sleeve can be welded at one of its ends to one of the face plates and at its other end to one of the sleeves.

In place of a single frusto-conical sleeve, it is also possible to use an assembly consisting of at least two coaxial frusto-conical sleeves separated by a constant distance and welded to the sleeves or the face plates.

It is also possible to envisage a stiffening assembly consisting of at least two coaxial frusto-conical sleeves separated by a constant distance, i.e., having the same vertex angle, and joined to one another by means of spacers. It is also possible to envisage one or more frusto-conical sleeves comprising strengtheners to prevent them from buckling, although the concrete surrounding these stiffening sleeves virtually prevents them from deforming.

Finally, the slab according to the invention is applicable to all fast neutron nuclear reactors comprising an annular slab, the central part of which supports a heavy assembly such as a rotating plug for handling the fuel assemblies.

I claim:

1. In a nuclear reactor comprising a concrete structure including a cylindrical vessel well (21) with a vertical axis having an upper part on which a slab (20) having a periphery rests horizontally, said slab consisting of a composite structure of steel and concrete, and a vessel (40) suspended from a lower part of said slab, said slab closing said vessel and comprising an annular envelope consisting of two coaxial cylindrical sleeves (25, 27) and two annular face plates (28, 29) joined together directly and by means of a stiffening assembly, said envelope being filled with concrete except for cylindrical spaces (24) with axes parallel to the axis of said sleeves (25, 27) and passing right through said slab (20) for the passage of reactor components immersed in said vessel (40), which slab comprises, inside said envelope, as the stiffening element, the improvement consisting of at least one frusto-conical sleeve (30) coaxial with said sleeves (25, 27) limiting said slab (20), welded to said envelope along its small base in the region of said upper part of said envelope, and along its large base in the region of said lower part of said envelope, having openings for the passage of said components and dividing the interior volume of said envelope into two superposed parts.

2. The improvement as claimed in claim 1, wherein said upper part of said envelope, above said frusto-conical sleeve (30), is filled with concrete incorporating metal reinforcements (33) and forming a continuous strong structure over the entire periphery of said slab (20).

3. The improvement as claimed in claim 1 or 2, wherein said frusto-conical sleeve (30) is fixed in its lower part to a lower surface of said outer sleeve (25) of said envelope, in a part (35) of the latter which is reinforced and surrounded exteriorly by a reinforcing support structure (37) making it possible to rest said slab (20) on an upper part of said vessel well (21).

4. The improvement as claimed in claim 1 or 2, wherein said frusto-conical sleeve (30) is welded at its lower end to said outer sleeve (25) of said envelope and at its upper end to said inner sleeve (27) of said envelope.

5. The improvement as claimed in claim 1 or 2, wherein said frusto-conical sleeve (30) is welded at its lower end to said lower face place (20) and at its upper end to said upper face plate (28) of said envelope.

6. The improvement as claimed in claim 1 or 2, wherein said frusto-conical sleeve is welded at one of its ends to one of said cylindrical sleeves (25, 27) of said envelope and its other end to one of said face plates (28, 29) of said envelope.

* * * * *